United States Patent
Andersen et al.

(10) Patent No.: US 10,135,354 B2
(45) Date of Patent: Nov. 20, 2018

(54) DC-LINK REFERENCE VOLTAGE DETERMINATION FOR WIND TURBINE CONVERTER SYSTEMS

(71) Applicant: VESTAS WIND SYSTEMS A/S, Aarhus N (DK)

(72) Inventors: Søren Andersen, Tilst (DK); Gert Karmisholt Andersen, Hovedgård (DK); Duy Duc Doan, Tilst (DK); John Godsk Nielsen, Hornslet (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 15/541,217

(22) PCT Filed: Dec. 8, 2015

(86) PCT No.: PCT/DK2015/050384
§ 371 (c)(1),
(2) Date: Jun. 30, 2017

(87) PCT Pub. No.: WO2016/107625
PCT Pub. Date: Jul. 7, 2016

(65) Prior Publication Data
US 2017/0358997 A1 Dec. 14, 2017

(30) Foreign Application Priority Data
Dec. 30, 2014 (DK) .................. 2014 70834

(51) Int. Cl.
*H02M 5/458* (2006.01)
*F03D 9/25* (2016.01)
(Continued)

(52) U.S. Cl.
CPC .......... *H02M 5/4585* (2013.01); *F03D 9/255* (2017.02); *H02M 2001/0025* (2013.01);
(Continued)

(58) Field of Classification Search
CPC .......... H02M 5/40; H02M 5/42; H02M 5/453; H02M 5/45; H02M 5/458; H02M 5/4585; H02M 5/451; H02M 3/33507
(Continued)

(56) References Cited

U.S. PATENT DOCUMENTS 6,028,779 A 2/2000 Sakamoto et al.
2006/0203528 A1 9/2006 Miyazaki et al.
(Continued)

FOREIGN PATENT DOCUMENTS

EP 1990906 A1 11/2008

OTHER PUBLICATIONS

Danish Search Report for PA 2014 70834, dated Aug. 12, 2015.
International Search Report for PCT/DK2015/050384, dated Feb. 12, 2016.

*Primary Examiner* — Adolf Berhane
(74) *Attorney, Agent, or Firm* — Patterson + Sheridan, LLP

(57) ABSTRACT

A method of setting a reference DC-link voltage of a wind-turbine converter system is provided. At least at least one DC voltage demand from at least one generator-side inverter and at least one DC voltage demand are received from at least one grid-side inverter. A generator-side DC voltage demand value on the basis of the at least one DC voltage demand received from the at least one generator-side inverter. Also a grid-side DC voltage demand value is determined on the basis of the at least one DC voltage demand received from the at least one grid-side inverter. The highest DC voltage demand value out of the generator-side and grid-side DC voltage demand values is chosen. This chosen value corresponds to the set reference DC-link voltage.

14 Claims, 8 Drawing Sheets

(51) Int. Cl.
*H02M 1/00* (2006.01)
*H02P 101/15* (2016.01)

(52) U.S. Cl.
CPC . *H02M 2001/0077* (2013.01); *H02P 2101/15* (2015.01); *Y02E 10/76* (2013.01)

(58) Field of Classification Search
USPC .................................. 363/34, 35, 37, 40, 95
See application file for complete search history.

(56) References Cited

U.S. PATENT DOCUMENTS

| | | |
|---|---|---|
| 2009/0008937 A1 | 1/2009 | Erdman et al. |
| 2010/0142237 A1 | 6/2010 | Yuan et al. |
| 2011/0140430 A1 | 6/2011 | Ritter et al. |
| 2011/0140534 A1* | 6/2011 | Yasugi .................... H02J 3/005 307/80 |
| 2011/0221280 A1 | 9/2011 | Delmerico et al. |
| 2013/0016537 A1 | 1/2013 | Deng |
| 2013/0049707 A1* | 2/2013 | Wang ........................ H02P 6/00 322/21 |
| 2017/0331295 A1* | 11/2017 | Abeyasekera .......... H02J 3/386 |

* cited by examiner

DC-LINK REFERENCE VOLTAGE DETERMINATION FOR WIND TURBINE CONVERTER SYSTEMS

FIELD OF THE INVENTION

The invention relates to the field of controlling a wind turbine converter, more specifically to a method of setting a reference DC-link voltage for the wind turbine converter.

BACKGROUND

DE 102008034532 relates to a method of controlling a converter of a doubly fed induction generator (DFIG), wherein the DC-link voltage is set such that the DC voltage received by the grid-side inverter is higher than the utility grid-voltage and such that the maximum admissible DC voltage for the generator-side inverter is respected.

SUMMARY OF THE INVENTION

According to a first aspect, a method of setting a reference DC-link voltage of a wind-turbine converter system is provided, wherein the wind-turbine converter system comprises at least one generator-side inverter and at least one grid-side inverter that are electrically coupled by the DC-link. The method comprises receiving at least at least one DC voltage demand from at least one generator-side inverter and at least one DC voltage demand is received from at least one grid-side inverter and determining a generator-side DC voltage demand value on the basis of the at least one DC voltage demand received from the at least one generator-side inverter as well as determining grid-side DC voltage demand value on the basis of the at least one DC voltage demand received from the at least one grid-side inverter. The method comprises setting the reference DC-link voltage with regard to the generator-side DC voltage demand value and the grid-side DC voltage demand value, wherein setting the reference DC-link voltage comprises selecting the highest DC voltage demand value out of the generator-side DC voltage demand value and the grid-side DC voltage demand value. Setting the reference DC-link voltage further comprises determining the reference DC-link voltage on the basis of said highest DC voltage demand value.

According to a second aspect, a method of operating a wind turbine converter system comprising at least one generator-side inverter and at least one grid-side inverter and a DC-link coupling the at least one generator-side inverter and the at least one grid-side inverter. A DC-link voltage is present in the DC-link when the wind turbine converter system is operated. The DC-link voltage is controlled to follow a reference DC-link voltage as determined in relation to the first aspect by decreasing a deviation between the reference DC-link voltage and the present DC-link voltage by establishing a net power flow into or out of the DC-link. The net power flow is a difference between power flowing into the DC-link at the generator-side inverter and power flowing out of the DC-link at the grid-side inverter.

According to a third aspect, a wind-turbine converter system is provided. The wind-turbine converter system comprises a converter and a converter controller. The converter comprises at least one grid-side inverter and at least one generator-side inverter. The converter controller comprises a generator-side converter controller and a grid-side converter controller, the generator-side converter controller is arranged to receive at least one DC voltage demand from at least one generator-side inverter, determine a generator-side DC voltage demand value on the basis of the at least one DC voltage demand received from the at least one generator-side inverter.

The grid-side converter controller being arranged to receive at least one DC voltage demand from at least one grid-side inverter, determine a grid-side DC voltage demand value of on the basis of the at least one DC voltage demand received from the at least one grid-side inverter.

Either the grid-side or the generator-side converter controller functions as a master converter controller. The master converter controller is arranged to set the reference DC-link voltage, wherein the master-converter controller is arranged to select the highest DC voltage demand value out of the generator-side DC voltage demand value and the grid-side DC voltage demand value determine the reference DC-link voltage on the basis of said highest DC voltage demand value, when setting the reference DC-link voltage.

According to a fourth aspect, a wind-turbine equipped with the converter system according to the third aspect is provided.

GENERAL DESCRIPTION, ALSO OF OPTIONAL EMBODIMENTS OF THE INVENTION

According to a first aspect, a method of setting a reference DC-link voltage of a wind-turbine converter system is provided. The reference DC-link voltage is, for example, a target value for the DC voltage in the DC-link to be achieved. The DC-link electrically couples at least one generator side inverter and at least one grid side inverter comprised by the wind turbine converter system. A converter with generator-side and grid-side inverters connected in parallel, the positive and negative voltage outputs of which are coupled by a single DC-link, as well as a converter with only one generator-side inverter and one grid-side inverter coupled by a DC-link that way are further referred to as "single string" converter. The at least one generator-side inverter is typically rectifier comprising active semiconductor switching elements, such as IGBT switches that is coupled to a three phase current output of a wind-turbine generator. The at least one generator-side inverter converts a variable frequency AC input current received from the generator to a DC current fed to the DC-link of the converter system, respecting the reference DC-link voltage. The DC-link feeds the DC current received from the at least one generator-side inverter to the at least one grid-side inverter, also respecting the reference DC-link voltage. The grid-side inverter converters this DC current into a fixed frequency AC current to be fed to an electricity grid. This AC current is, for example, a 50 Hz or 60 Hz AC current.

The method comprises receiving at least one DC voltage demand from the at least one generator-side inverter. Due to variable wind conditions such as wind speed or the angle of attack of the wind and variable conditions of the electricity grid, the DC-link voltage is not constant or predetermined but rather fluctuates around a targeted value. To take these variable conditions into account, the reference DC voltage value has to be adjusted according to these conditions, also respecting conversion constraints of the wind turbine converter system.

The conversion operation from variable frequency AC input current to DC current, carried out by the generator-side inverter is, for example, limited by a maximum admissible current across the semiconductor switches. Hence, also the output current of at least one the generator-side inverter (also for inverters in general) is limited. Due to this limitation, the maximum active output power fed through the DC-link to the at least one grid-side inverter is also limited, as the active power fed through the DC-link towards the grid-side inverter is defined as P=U*I, wherein U is the DC-link voltage and I is the total output current of the at least one generator-side inverter.

Hence, in response to the momentary temperature of the generator-side inverter or to the momentary current flow across the generator-side inverter, the generator-side inverter demands for example a higher or lower DC-link voltage in order to prevent damage of its components and to fulfill an active power target provided to the wind turbine converter system by, for example, a wind turbine controller.

The method further comprises receiving at least one DC voltage demand from the at least one grid-side inverter. The DC voltage demand of the grid-side inverter results, for example, out of a combination of the output-current constraints of the conversion operation of the inverters and given active or reactive power targets provided to the inverters and constraints given by variable electricity grid conditions, such as a fluctuating terminal voltage at the output of the grid-side inverter.

In order to be able to feed voltage and current of a certain phase into the electricity grid, the DC-link voltage has to be higher than the momentary grid voltage. Otherwise current would start to flow from the electricity grid to the wind turbine generator, rather than from the wind turbine generator to the electricity grid.

The DC voltage demand of the at least one grid-side inverter and the DC voltage demand by the at least one generator-side inverter are, in general, different, due to the different constraints that have to be respected by the grid-side and the generator-side inverter(s).

To take into account the possibly different DC voltage demands received from the at least one generator-side inverter, a generator-side DC voltage demand value is determined on the basis of the at least one DC voltage demand received from the at least one generator-side inverter. A grid-side DC voltage demand value is determined on the basis of the at least one DC voltage demand received from the at least one grid-side inverter, accordingly.

In some embodiments, determining the generator-side DC voltage demand value comprises averaging the DC voltage demand values received from the generator-side inverter(s) and determining the grid-side DC voltage demand value comprises averaging the DC voltage demand values received from the grid-side inverter(s).

If the wind turbine converter system comprises more than one inverters, the DC voltage demands received from these inverters are, for example, averaged to obtain the generator-side or grid-side DC voltage demand value.

If the wind turbine converter system comprises only one grid-side inverter and only one generator-side inverter, DC voltage demands received in a certain time interval from the same inverter are, for example, averaged, to obtain the generator-side or grid-side DC voltage demand value.

Alternatively, if the wind turbine converter system comprises only one grid-side inverter and only one generator-side inverter, the DC voltage demand of the respective generator-side/grid-side inverter corresponds to the generator-side/grid-side DC voltage demand value, without any averaging over time.

Subsequent to determining the generator-side DC voltage demand value and the grid-side DC voltage demand value, the reference DC-link voltage is set.

Setting the reference the reference DC-link voltage comprises selecting the highest DC voltage demand value out of the generator-side DC voltage demand value and the grid-side DC voltage demand value. The reference DC-link voltage is then determined on the basis of said highest DC voltage demand value.

Therefore, the reference DC-link voltage, corresponds to, for example, the generator-side DC voltage demand value or the grid-side DC voltage demand value, depending on which DC voltage demand value is higher.

Setting the reference DC-link voltage as described above maximizes the active/reactive power output of wind turbine converter.

The selected highest DC voltage demand value demand value is, for example, set as the reference DC-link voltage but is limited by an inverter controller of an inverter to which this reference DC-link voltage is applied, if the reference DC-link voltage is above a given maximum DC voltage threshold for the inverter or below a given minimum DC voltage threshold for the inverter controlled by said inverter controller.

The limited value of the reference DC-link voltage is then set as the new reference DC-link voltage. As the value of the preliminary reference DC-link voltage (before the limitation) was a generator/grid-side DC voltage demand value, the new reference DC-link voltage is still based on the selected generator-side or grid-side DC voltage demand value.

In some embodiments, the converter system comprises at least two converter strings. In these embodiments, at least one DC voltage demand is received from at least one generator-side inverter of a respective first and second converter string. At least one DC voltage demand is received from at least one grid-side inverter of a respective first and second converter string, also.

The DC voltage demands of the at least one generator-side inverters and the DC voltage demands of the at least one grid-side inverters of the first and second converter string are, as described above, a result of a combination of active/reactive power production targets received, for example, from a wind turbine controller and the above mentioned constraints.

A generator-side DC voltage demand value of a first converter string is determined on the basis of at least one DC voltage demand of the generator-side inverters of the first converter string. Also a grid-side DC voltage demand value of the first converter string is determined on the basis of the at least one DC voltage demand of the grid-side inverters of the first converter string. As well the generator-side as the grid-side DC voltage demand values of the first string are determined, for example, as described above for the single string converter. Furthermore, a DC voltage reference value of the first converter string is determined on the basis of the grid-side and generator-side DC voltage demand values of the first converter string.

Likewise, a generator-side DC voltage demand value for the second converter string is determined on the basis of at least one DC voltage demand of the generator-side inverters of the second converter string. Also a grid-side DC voltage demand value of the second converter string is determined on the basis of the at least one DC voltage demand of the grid-side inverters of the second converter string. Also these generator-side and grid-side DC voltage demand values of the second string may be determined as described above for the single string converter. Also a DC voltage reference value of the second converter string is determined on the basis of the grid-side and generator-side DC voltage demand values of the second converter string.

The DC voltage reference values of the first and second converter string can be different, as semiconductor switches of the generator-side and/or grid-side inverters of the first converter and second converter string are, for example, differently actuated on purpose due to different output demands for the two strings by the wind turbine controller.

However, also the total current output of the inverters of the first string may be different to the total current output of the inverters of the second string although the inverters of the respective strings follow the same switching pattern. This can be the case due to manufacturing deficiencies of the semiconductor switches of at least one inverter of the first or second converter string. The DC voltage reference could, for example, be differently determined for the two converter strings by a control loop comparing the momentary set DC voltage reference of a string with the actual DC voltage of the converter strings DC-link. Hence, the DC voltage reference value of the first and second converter string are then different as to compensate for these manufacturing deficiencies of the semiconductor switches.

The reference DC-link voltage is set using the determined DC voltage reference values of the first and second converter string.

In embodiments with at least two converter strings, in the case of a common DC-link for all the converter strings the reference DC-link voltage is, for example, the target value for the DC voltage of the common DC-link.

In embodiments with converter strings that have separate DC-links, i.e. one DC-link for each respective set of generator-side inverters and grid-side inverters, the reference DC-link voltage is, for example, the target value for each separate DC-link of a converter string. These converter strings with separate DC-links are, for example, electrically connected in parallel.

In analogy to the examples described above for a single string converter, the set DC-link reference voltage, corresponds to, for example, the DC voltage reference of the first converter string, the DC voltage reference of the second converter string or to a combination of these two DC voltage references.

In some embodiments, determining the DC voltage reference value of the respective first and second converter string comprises selecting the highest DC voltage demand out of the grid-side DC voltage demand and the generator-side DC voltage demand of the respective first and second converter string.

If the grid-side inverter of a respective string demands a higher DC-link voltage than the generator-side inverter of a respective string in order to be able to be able to feed a certain amount of active power into the grid and this DC-link voltage is admissible for the generator-side inverter, the DC-link voltage demanded by the grid-side inverter is, for example, chosen as the DC voltage reference of the respective string.

As described above for example of the single string converter system, selecting the highest DC voltage demand out of, for example, an average demand of the generator-side inverters and an average demand of the grid-side inverters of a certain converter string as the DC voltage reference value of this converter string, assures a maximum power-output of the converter string.

In some embodiments, determining the DC voltage reference value of a converter string comprises limiting the DC voltage reference value of the converter string in response to the DC voltage reference of the converter string value being above a given maximum DC voltage threshold or below a given minimum DC voltage threshold for the converter string.

The DC voltage reference value of a converter string is for example above a given maximum DC voltage threshold, if, for example, a malfunction in one of the inverters of the respective converter string would not be able to cope with that DC voltage reference value. For example, the DC voltage reference value could be so high that the generator-side inverter of the converter string, i.e. the rectifier would not be capable of producing such a DC high voltage or such a high DC voltage would cause currents flowing across the grid-side inverters semiconductor switches that would lead to a damage of these switches.

If the DC voltage reference value of the converter string is below a given minimum DC voltage threshold, for example, a AC voltage at a coupling point to the grid, e.g. at the wind turbines transformer, is higher than the reference DC voltage of the converter string. If such a DC voltage reference value of the converter string were chosen this probably would cause undesired currents flowing from the grid towards the generator. Furthermore in such a case no current could be fed into the grid by the wind turbine.

By limiting the DC voltage reference value of a converter string, it is assured that these converter string related references are within admissible ranges for converter string operation, when they are used for setting the reference DC-link voltage on the basis of these DC voltage reference values of the first and second converter string.

The limitation of the DC voltage reference value of a string is for example accomplished by setting the DC voltage reference of the respective converter string to the maximum admissible DC voltage value for the respective converter string. This maximal admissible value is mainly determined by voltage and current tolerances of converter string components.

In some embodiments, setting the reference DC-link voltage comprises selecting the highest DC voltage reference value of the determined DC voltage reference values of the first and second reference converter string.

One of the DC voltage reference values of the respective first or second converter string is, for example, chosen as the reference DC-link voltage. To ensure a maximum active/reactive power output of the converter system of the wind turbine, comprising these converter strings, the highest of the DC voltage reference values of the converter strings is chosen as the reference DC-link voltage.

The selection of the highest DC voltage reference value out of the DC voltage reference values of the at least two second converter strings as a value corresponding to the reference DC-link voltage is, for example, accomplished by the master-converter controller of the wind turbine.

The master converter controller is, for example, a converter string controller, for example, the grid-side or generator-side converter controller of a converter string. The converter string controller in turn is, for example, the controller that directly receives commands and targets from the wind turbine controller and derives electrical operational targets and parameters for the string associated with itself and the other converter string(s).

In some embodiments, the reference DC-link voltage is limited by a converter controller of the wind turbine in response to the reference DC-link voltage being above a given maximum DC voltage threshold or below a given minimum DC voltage threshold.

The DC-link reference voltage is, for example, limited by a controller of an inverter that is not capable of dealing with that DC-link reference voltage as the DC-link reference voltage is too high or too low for that inverter, i.e. exceeding a given maximum threshold or falling below a given minimum threshold. This inverter controller is carrying out this limitation is, for example, any inverter controller or that is merely arranged to receive and carry out commands from the master-converter controller, i.e. a slave converter controller, or the inverter controller being set as the master controller itself.

The inverter controller not capable of dealing with the selected DC-link reference voltage, for example, sets the DC-link reference voltage to the highest or lowest value DC voltage level admissible for that inverter.

Hence the generator-side/grid-side DC voltage demands of the other inverters of the respective converter string or the DC voltage reference values of the converter strings is at least partially reflected by the resulting reference DC-link voltage, but at least, the power production constraints of the inverter for which the reference DC-link voltage would have been critical is respected.

In some embodiments, the generator-side inverters of the first and second converter string are connected in series and the grid-side inverters of the first and second converter string are connected in series. The series connection of the grid-side inverters of the first and second converter string and the series connection of the generator-side inverters of the first and second converter string each form a neutral connection point.

In more detail, the series connection of the generator-side inverters of the first and second converter string is, for example, established by electrically connecting the negative DC level output of the generator-side inverter of the first converter string and the positive DC level output of the generator-side inverter of the second converter string to form the neutral connection point. Likewise, the positive and negative DC level input of the grid-side inverters of the first and second converter string are electrically connected to form another neutral connection point.

The neutral-connection points are, for example, connected to each other by a center connection line. The series connection of generator-side inverters and the series connection of grid side inverters are, for example, coupled to each other via a positive DC level conductor and a negative DC level conductor. Hence the positive DC level output of the generator-side inverter and the positive DC level input of the grid-side inverter of the first converter string are connected by the positive DC level conductor and the positive DC level output of the generator-side inverter and the negative DC level output of the grid-side inverter of the second converter string are connected by the negative DC level conductor. The center connection line, the positive DC level conductor and the negative DC level conductor are, for example, realized as copper cables.

In some embodiments in which the method is provided for a wind turbine with an arrangement of series connected grid-side and generator-side inverters of different converter strings as described above, the reference DC voltage level of the first converter string is, for example, a reference DC voltage between the positive DC level conductor and the center connection line. In some of these embodiments, the reference DC voltage level of the second converter string is, for example, a reference DC voltage between the negative DC level conductor and the center connection line.

The first and second converter strings are, for example coupled to the generator by separate generator windings connected to the respective generator-side inverter of the string. On the grid-side, the first and second converter strings are, for example coupled to the transformer and thereby to the grid by separate secondary transformer windings.

In embodiments when the method is applied to such converter arrangements, a compensation current will flow along the centre connection line, if the absolute value of the voltage between the positive DC level conductor and the centre connection line and the absolute value of the voltage between the centre connection line and the negative DC conductor are not equal.

Hence, if, for example, the DC voltage level of the first converter string is +1kV and the voltage level of the second converter string is −1,2kV a net compensation current driven by 200V will flow along the centre connection line.

However, in some embodiments, the absolute of the voltage between the positive DC level conductor and the center connection line and the absolute of the voltage between the positive DC level conductor and the center connection line are equal under standard operation conditions of the wind turbine converter system.

In standard operation conditions, the first and second converter string are operated in complete synchronism, which does not lead to the above described compensation current. Under standard operation conditions, the active/reactive power targets demanded from the strings by, for example, the master converter controller, are identical. In these embodiments the DC voltage references for the first and second strings are, for example, identical, therefore the reference DC-link is simply set to the absolute identical DC voltage reference value of the two strings.

In some embodiments the reference DC-link voltage is the absolute of the voltage level between the positive or negative DC level conductor and the center connection line.

Thereby the DC-link voltage is set correctly in such standard operation conditions As mentioned above, the DC voltage reference values of the converter strings were determined, for example, by selecting the highest value out of the absolutes of the generator-side demand value and the grid-side demand value of the respective converter string. As grid-side and generator-side inverters operate in complete synchronism in these embodiments, it is unlikely that the demands of the grid-side and/or generator side inverters and resulting associated generator-side and grid-side demand values are different on the two strings.

Nevertheless, deviations from standard operation conditions might occur, in a sense that the conversion operation of the first converter string is performed different than the conversion operation of the second converter string, although the same reference DC voltages or other target values were applied to them. This can be caused, for example, by manufacturing differences of semiconductor switches integrated in the grid-side and/or generator-side inverters of a converter string.

In the case that the generator-side or grid-side inverter(s) of the first converter string performs the conversion operation with slightly larger current pulses—producing a slightly higher amount of current—than the generator-side or grid-side inverter(s) of the second converter string, for example, a compensation current as described above flows across the centre connection line, although the converter strings were supplied with the same reference DC voltage values.

A converter-string controller of second converter string is, for example, supplied with a higher reference DC voltage in order to adjust the switching behaviour of the generator-side/grid-side inverter(s) of the second converter string such that a higher current flow in the second converter string can be achieved. The reference DC voltage of the second converter string is increased such that the current flowing in the second converter string along the centre connection line and the current in the flowing first converter string along the centre line connection line cancel out each other.

Such an exemplary behaviour compensates for the compensation current in the centre line, but introduces unequal DC voltage reference values to the two converter strings.

According to some embodiments of the method described herein, the maximum DC voltage reference value out of the DC voltage reference values of the two strings is chosen as the reference DC-link voltage.

In the example provided above, the DC voltage reference values of the second converter string is chosen as the reference DC-link voltage, accordingly.

When applying this reference DC-link voltage to the two converter strings, due to the differences of the first and second string's inverter's switching behaviour, again a compensation current along the centre connection line is introduced, as the actual current produced by the first converter string is again higher due to its slightly larger current pulses. However, by reducing the length of the current pulses of the first converter, the actual current flow on the first and second can be made equal again, to compensate for the compensation current flowing along the centre connection line. The current flow is then equal, but the voltage in the DC-link is increased according to the set reference DC-link voltage. Hence, the current along the centre connection line is compensated for, and the power output of the converter is increased.

In some embodiments, the grid-side inverters of a converter string are electrically connected to each other in parallel and the generator-side inverters of a converter string are electrically connected to each other in parallel. Thereby the total convertible amount of current by the generator-side inverters of a converter string and the grid-side inverters of a converter string is increased.

In some embodiments, determining the DC voltage reference values of the first and the second converter string comprises averaging the DC voltage demands of the grid-side inverters electrically coupled in parallel and averaging the DC voltage demands of the generator-side inverters electrically connected in parallel to obtain the respective grid-side DC voltage demand value and the generator-side DC voltage demand value of the respective first and second converter string.

Hence, for example a root-mean-square or a mean value of the DC voltage demands of the electrically parallel connected grid-side inverters is determined for each converter string to obtain the grid-side DC voltage demand value of the converter string. Likewise, for example, a root-mean-square or a mean value of the DC voltage demands of the electrically parallel connected generator-side inverters is determined to obtain the generator-side DC voltage demand value of the converter string.

Averaging of the generator-side/grid-side inverters DC voltage demands mitigates the influence of possible "runaway" demands that would probably lead to a too high or too low DC-link reference voltage on the determination of the DC voltage demands of a converter string.

Determining the respective DC voltage references of the first and second converter string further comprises selecting the highest DC voltage demand value out of the generator-side and grid-side DC voltage demand values of the respective converter string.

By carrying out this selection, the demand leading to the higher possible active/reactive power production per converter string is chosen as the DC voltage reference value of the respective converter string.

As mentioned above, for example, the highest absolute DC voltage reference values of the DC voltage reference values of the first and second converter string is chosen as the reference DC-link voltage of the converter system before a possible limitation. If, for example, in the above described embodiment, the DC voltage reference value of the first string corresponding to a voltage between the positive DC level conductor and the center connection line is +1000 V and the DC voltage reference value of the second string corresponding to a voltage between the negative DC level conductor and the center connection line is −1100 V, the absolute of the reference DC-link voltage is set to 1100 V.

According to second aspect, a method of operating a wind turbine converter system is provided. The wind turbine converter system comprises at least one generator-side inverter and at least one grid-side inverter and a DC-link coupling the at least one generator-side inverter and the at least one grid-side inverter, wherein a DC-link voltage is present in the DC-link. The DC-link voltage is controlled to follow a reference DC-link voltage. The reference DC-link voltage is, for example, determined as described in conjunction with the exemplary embodiments above. As the DC-link voltage is controlled to follow the reference DC-link voltage, the DC-link voltage is controlled to match the reference DC-link voltage or at least to approach the reference DC-link voltage. The present DC-link voltage is controlled decreasing a deviation between the reference DC-link voltage and the present DC-link voltage by establishing a net power flow into or out of the DC-link. The net power flow in this context refers to a difference between (active) power flowing into the DC-link at the generator-side inverter and (active) power flowing out of the DC-link at the grid-side inverter.

If this difference, representing the net power flow, is positive, the (active) power flowing into the DC-link is higher than the (active) power flowing out of the DC-link. This is, for example, achieved by increasing the "on times" of the semiconductor switches of the at least one generator-side inverter, i.e. the times they are in a switching state such as to inject direct current into the DC-link, in relation to the "on times" of the semiconductor switches of the at least one grid-side inverter, i.e. the times they are in a switching state such as to inject ac current into the grid. This positive net power flow increases the DC-link voltage to follow the reference-DC link voltage, if said reference-DC link voltage is higher than the present DC-link voltage.

Likewise, a negative net power flow decreases the present DC-link voltage. A negative net power flow is, for example, achieved by increasing the "on times" of the at least one grid-side inverter in relation to the "on times" of the semiconductor switches of the at least one generator-side inverters.

According to a third aspect, a wind-turbine converter system is provided. The wind-turbine converter system comprises a converter and a converter controller. The converter controller comprises a generator-side converter controller and a grid-side converter controller. The generator-side converter controller is arranged to determine a generator-side DC voltage demand on the basis of the at least one DC voltage demand received from the at least one generator-side inverter. The grid-side converter controller is arranged to receive at least one DC voltage demand from at least one grid-side inverter and to determine a grid-side DC voltage demand value of on the basis of the at least one DC voltage demand received from the at least one grid-side inverter.

Either the grid-side or the generator-side converter controller functions as a master converter controller. The master converter controller is further arranged to set the reference DC-link voltage. Therefore, the master converter controller is arranged to select the highest DC voltage demand value out of the generator-side DC voltage demand value and the grid-side DC voltage demand value and to determine the reference DC-link voltage on the basis of said highest DC voltage demand value.

In some embodiments, if there is only one inverter on the generator-side and one inverter on the grid-side, the master converter controller selects a highest DC voltage demand out of the DC voltage demand of the generator-side inverter and the DC voltage demand of the grid-side inverter as the DC voltage reference value of the converter string. In the case that there is only one generator-side inverter and only one grid-side inverter, the generator-side DC voltage demand value corresponds to the demand of the generator-side inverter and the grid-side DC voltage demand value corresponds to the grid-side DC voltage demand value.

If the converter system is, for example, equipped with a plurality of generator-side/grid-side inverters for each string, the generator-side DC voltage demand and the grid-side DC voltage demand value are, for example, determined by averaging the DC voltage demands of the generator-side inverters and by averaging the DC voltage demands of the grid-side inverters, respectively. This averaging operation is, for example, performed by the respective generator-side or grid-side converter controllers.

In some embodiments, a converter controller that is not the master converter controller of the wind turbine is arranged to limit the reference DC-link voltage set by the wind turbine controller as described above.

In some embodiments, the wind turbine converter system is arranged to carry out any of the methods described above.

According to a fourth aspect, a wind turbine equipped with the wind-turbine converter system according to the third aspect is provided. The wind turbine comprises a rotor driven by wind connected to a nacelle mounted on top of a wind turbine tower. A shaft couples the rotor either to a gearbox that is coupled to the generator driven by the rotor directly. Alternatively, a shaft couples the rotor to a gearbox that is in turn coupled to the generator.

The generator-side inverters of the wind turbine are, for example, arranged in a nacelle of the wind turbine, whereas the grid-side inverters are, for example arranged in the tower of the wind turbine. The inverters are, therefore coupled by a DC link that is extended along the tower. By implementing the arrangement of series connected grid-side and generator-side inverters coupled by a positive DC level conductor, a negative DC level conductor and a center connection line connecting the neutral connection points of these series connections, as described above, the amount of DC voltage transmitted via the DC link is increased, thereby the current necessary to achieve an equal power transmission is reduced. Thereby also the electric resistance of the DC conductors can be increased, thereby reducing, for example, the amount of conductive material needed for the positive and negative DC level conductors. If these conductors were realized as copper cables, the diameter of these copper cables can be reduced.

Furthermore less heat sensitive converter parts are placed in the nacelle. By arranging the grid-side inverters in the tower of the wind turbine, also the overall weight of the nacelle is reduced, which in turn, leads, for example, to reduced wear of yaw bearings.

BRIEF DESCRIPTION OF THE DRAWINGS

Exemplary embodiments of the invention are now described, also with reference to the accompanying drawings, wherein FIG. 1 schematically illustrates a wind turbine equipped with a converter system including generator-side inverter(s) located in the nacelle and grid-side inverter(s) located in the tower of the wind turbine being part of a single-string converter system as shown in FIG. 2.

The drawings and the description of the drawings are of examples of the invention and are not of the invention itself. Like reference signs refer to like elements throughout the following description of embodiments.

DESCRIPTION OF EMBODIMENTS

Figure 1:
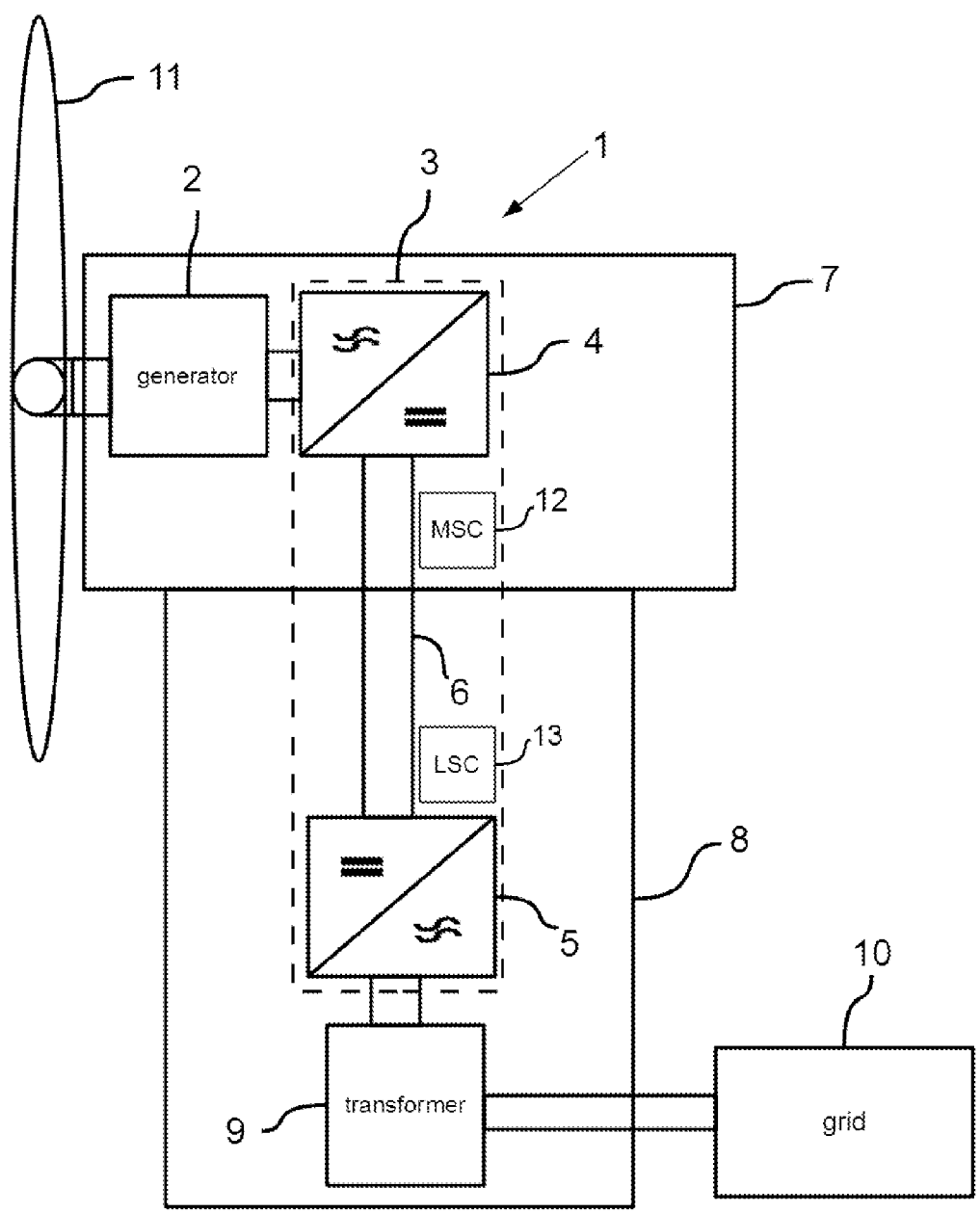

A wind turbine 1 has a nacelle 7 mounted atop a tower 8. The wind turbine 1, schematically illustrated by FIG. 1, is driven by a rotor 11 that is coupled to a generator 2, for example over a gear (not shown), to feed fixed frequency electrical power to an electricity grid 10. The generator 2 generates variable frequency AC current, wherein the frequency of the AC current is depends on wind speed. The variable frequency AC current is fed to a converter system 3, including at least one generator-side inverter 4 connected via a DC connection line 6 to at least one grid-side inverter 5. The grid-side and generator-side inverter(s) 4, 5 are represented each by a symbol for a single rectifier and a symbol for a single inverter in FIG. 1, for the sake of clarity. The generator-side inverter(s) 4 are located in the nacelle 7 of the wind turbine 1, whereas the grid-side inverter(s) 5 are located in the tower 8 of the wind turbine 1.

The generator-side inverters 4 rectify the variable frequency AC current produced by the generator, the resulting DC current is transmitted via the DC connection line 6 and is subsequently converted into fixed frequency AC current by the grid-side inverters 5. The at least one generator side inverter 4 is controlled by a machine/generator side converter controller 12 and the at least one grid-side inverter 5 is controlled by a grid side converter controller 13, respectively. The fixed frequency AC power produced by the at least one grid-side inverter 5 is fed to the electricity grid 10 by a transformer 9.

Figure 2:
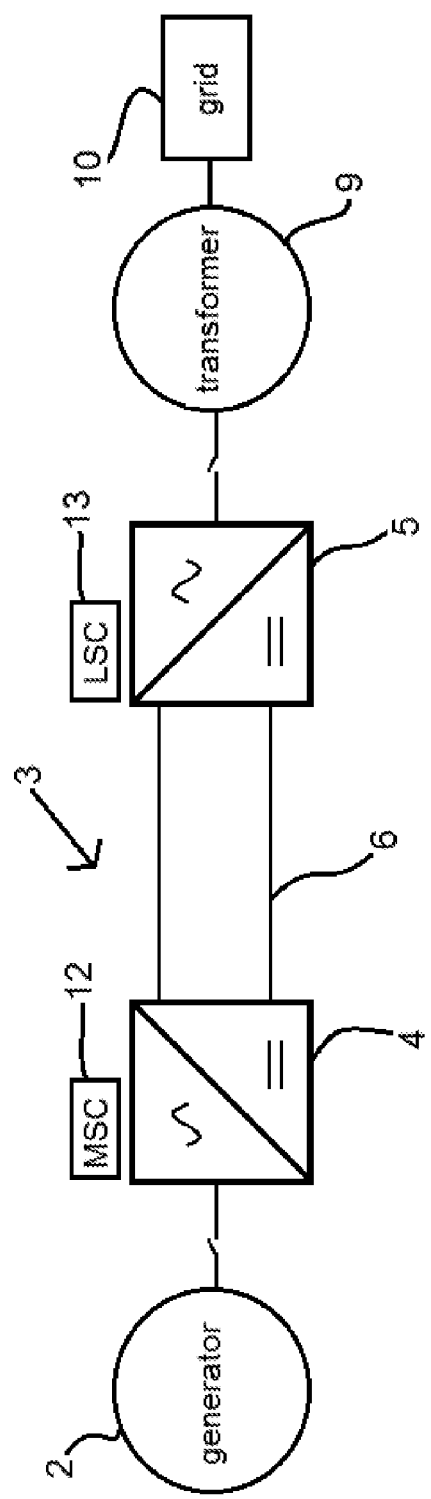
FIG. 2 is a circuitry diagram of a single-string converter system with grid-side inverters and generator-side inverters coupled by a single DC link.

The exemplary wind turbine of FIG. 1 is equipped with the exemplary converter system of FIG. 2. The generator-side inverter (rectifier) 4 of the converter system 3 is controlled by the generator-side inverter controller 12 and coupled to the generator 2 to converter variable frequency AC current into DC current conducted via the DC connection line 6 to the grid-side inverter 5. This grid-side inverter in turn converters the DC current into fixed frequency AC current, under the control of the grid-side converter controller 13. The resulting AC current is fed into the electricity grid 10 via the transformer 9.

Figure 3:
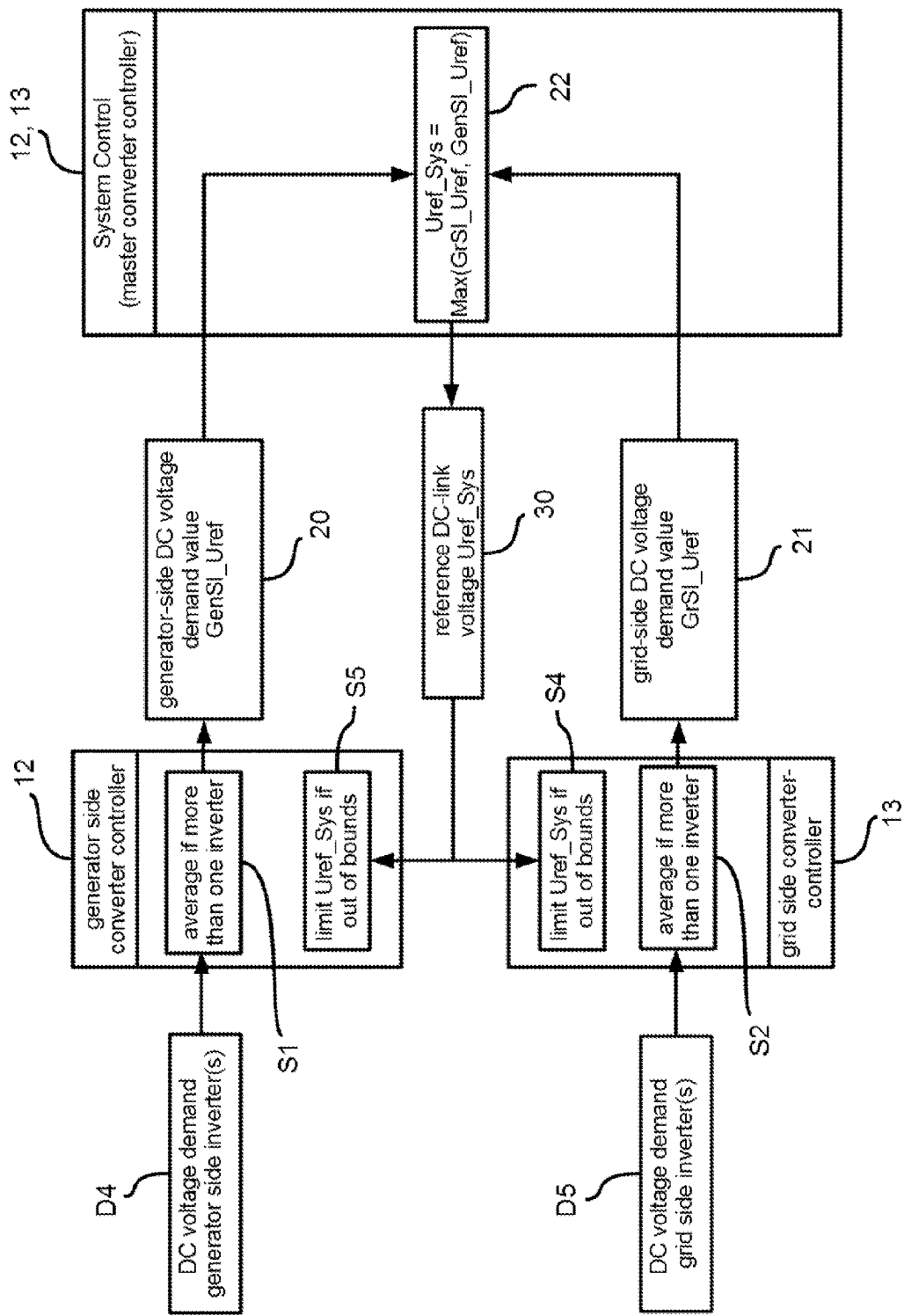
FIG. 3 is a block diagram of an exemplary method of determining a reference DC-link voltage applicable for the single-string converter system of FIG. 2, FIG. 4 schematically illustrates a wind turbine equipped with a dual string converter system with generator-side inverters in the nacelle of the wind turbine and grid-side inverters in the tower of the wind turbine.

A method of determining a reference DC link voltage 30 for a single string converter system 3 as described in FIG. 2 is represented by the block diagram of FIG. 3. ADC voltage demand of generator-side inverter(s) D4 is received by the generator-side converter controller 12. If more than one DC voltage demand is received, the DC voltage demands of the generator-side inverters are averaged in activity S1 to obtain a generator-side DC voltage demand value (GenSI_Uref) 20. If only one DC voltage demand D4 of a generator side inverter 4 is received, this demand D4 corresponds to the generator-side DC voltage demand value. Correspondingly, a grid-side DC voltage demand value (GrSI_URef) 21 is determined by a grid-side inverter controller, based on DC voltage demand(s) received from the grid-side inverters D5.

The determined generator-side and grid-side DC voltage demand values 20, 21 are received by a system control unit, in this embodiment the master converter controller that could either be the grid-side converter controller 13 or the generator-side converter controller 12. The master converter controller 12, 13 selects the highest demand value out of the generator-side and grid-side DC voltage demand values 20, 21 as the reference DC-link voltage 30.

The reference DC-link voltage 30 is transmitted to the generator-side and grid-side inverter controllers 12, 13 in order to cause them to change, for example, switching patterns of their semiconductor switches such that the reference DC-link voltage is applied to the converter system 3. If the reference DC-link voltage 30 should be out of an admissible range for at least one of the grid-side or generator-side inverters, the respective converter controller limits the reference DC-link voltage by setting the maximum or minimum admissible DC-link voltage as the new reference DC-link voltage 30.

Figure 4:
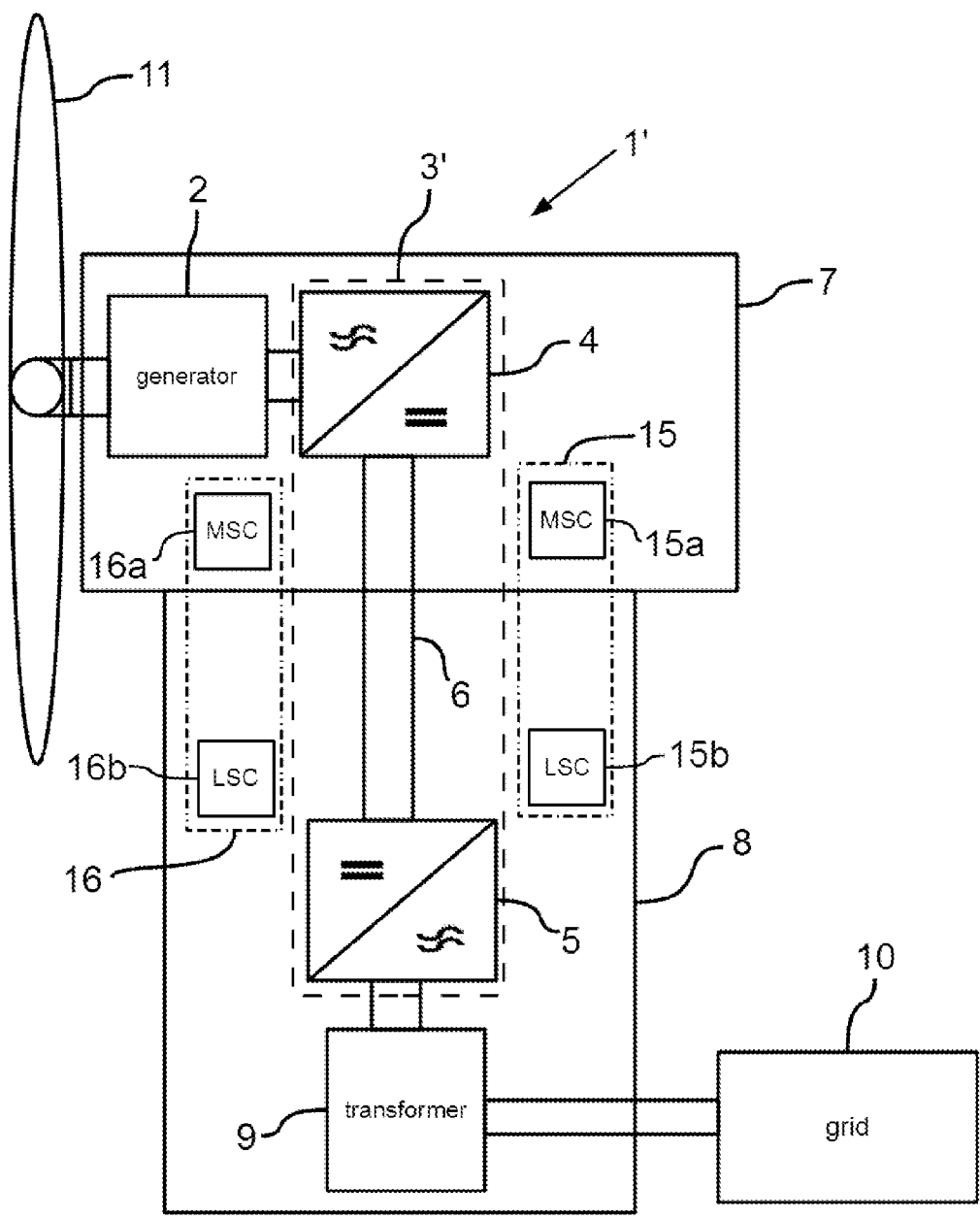

Another wind turbine being equipped with a dual-string converter system 3' is shown in FIG. 4. The dual string converter system 3' has two converter strings, a first converter string 15 with respective generator-side and grid-side inverters 4, 5 and a corresponding second converter string. Converter strings are hereinafter referred to as "strings". The generator-side and grid-side inverters 4, 5 of the first and second string are controlled by generator-side inverter controllers of the respective first and second converter string 15a, 16a and by grid side inverter controllers of the respective first and second string 15b, 16b.

Except for the converter system, the wind turbine 1' is identical to the wind turbine 1 already described in conjunction with FIG. 1.

Figure 5:
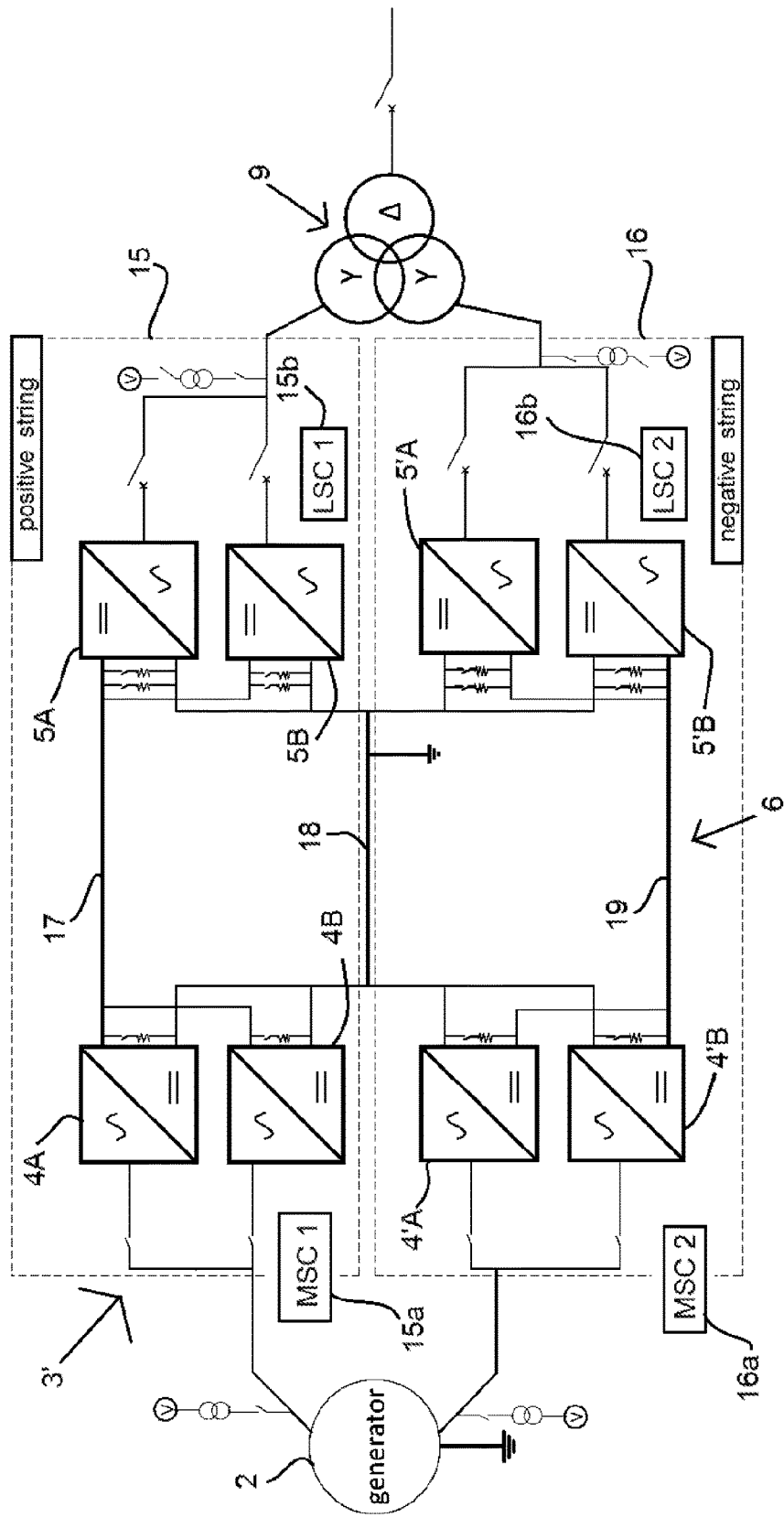
FIG. 5 is a circuitry diagram, representing a dual-string converter system with grid-side and generator-side inverter threads, forming a first and a second converter string, wherein the first and second converter string are coupled by a common centre connection line.

The dual string converter system 3' is further described in conjunction with a circuit diagram illustrated by FIG. 5. A generator 2, having two separate stator windings is coupled to a first and second converter string 15, 16 by these separate stator windings. The stator winding connected to the first string, in conjunction with FIG. 5 referred to as the positive string, feeds AC power to two rectifiers 4A and 4B of the positive string that are electrically connected in parallel. The stator winding connected to the second string, in conjunction with FIG. 5 referred to as the negative string, feeds AC power to two rectifiers 4'A and 4'B of the negative string that are also electrically connected in parallel. The AC-DC conversion of the rectifiers of the positive string 4A and 4B is controlled by the generator-side inverter controller of the positive string 15a, whereas the AC-DC conversion of the rectifiers of the negative string is controlled by the generator-side inverter controller of the negative string 16a. The rectifiers of the positive string 4A, 4B and the rectifiers of the negative string 4'A, 4'B are connected to each other in series and form a neutral connection point. The positive DC level output of the rectifiers 4A, 4B of the positive string is transmitted via a positive DC level conductor 17 and the negative DC level output of the rectifiers 4'A, 4'B of the second string is transmitted via a negative DC level conductor 19. The neutral connection point of the series connection of the parallel connected rectifiers of the positive string 4A, 4B to the parallel connected rectifiers of the negative string 4'A, 4'B is connected to a neutral central connection line 18.

The positive DC voltage level between the neutral central connection line 18 and the positive DC level conductor 17 is applied to grid-side inverters of the positive string 5A, 5B, that are also electrically connected in parallel. The negative DC voltage level between the neutral central connection line 18 and the negative DC level conductor 19 is applied to grid-side inverters of the negative string 5A, 5B, that are electrically connected in parallel, accordingly. In analogy to the generator-side, the parallel connected grid-side inverters of the positive string 5A, 5B are connected in series to the parallel connected grid-side inverters of the negative string. The grid-side inverters of the positive string 5A, 5B and the negative string 5'A, 5'B convert the positive or negative DC level respectively applied to them into fixed frequency AC output power. This conversion operation is controlled for the positive and negative string by a grid-side inverter controller of the positive string 15b and by a grid-side inverter controller of the negative string 16b, respectively. The fixed frequency power output of the grid-side inverters 5A, 5B of the positive string is fed to the transformer 9 via a first separate secondary side transformer winding, while the fixed frequency power output of the grid-side inverters 5'A, 5'B of the negative string is fed to the transformer 9 via a second separated secondary side transformer winding.

Figure 6:
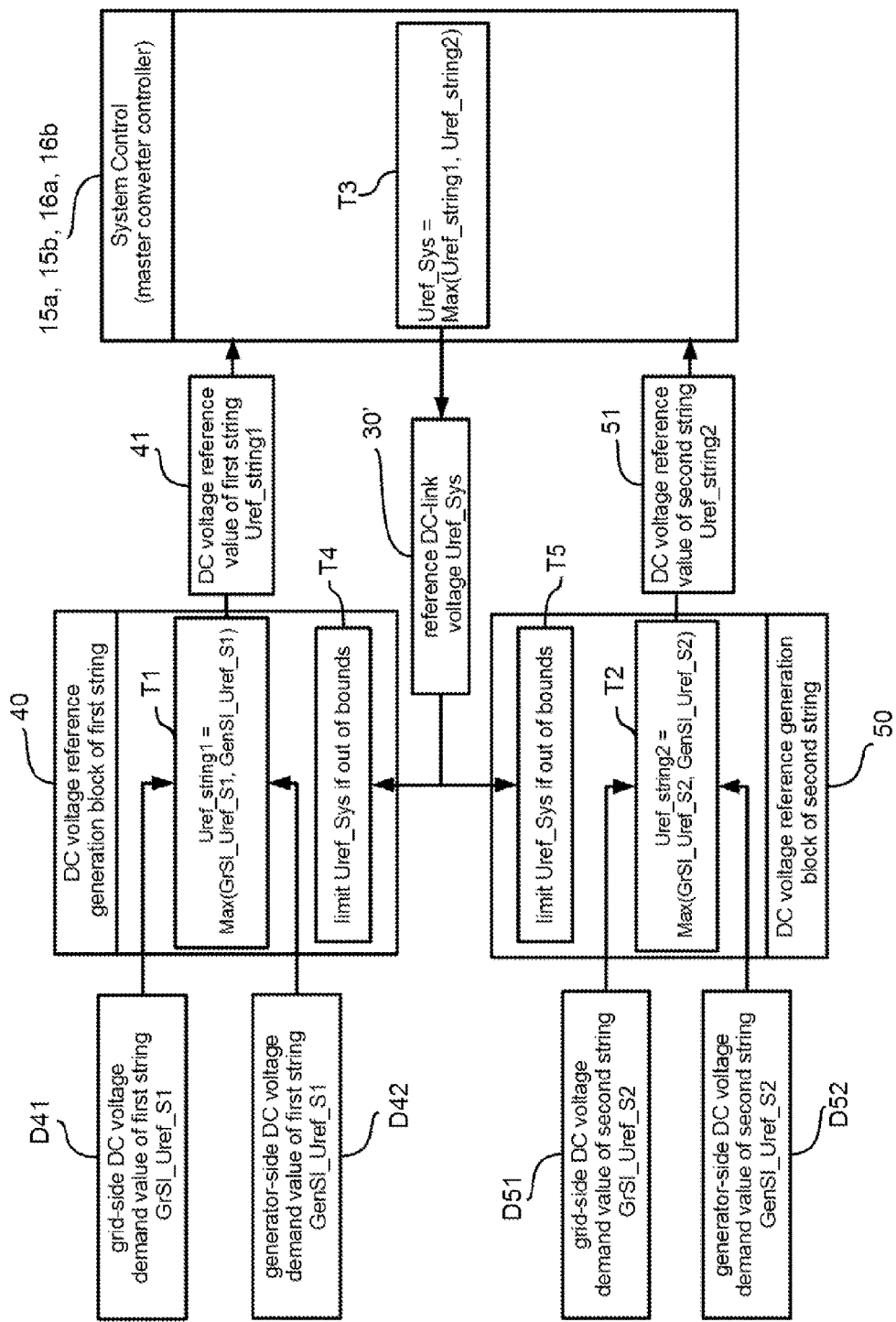
FIG. 6 is a block diagram that shows an exemplary method of determining a reference DC-link voltage applicable to the dual string converter system of FIG. 5.
Figure 7:
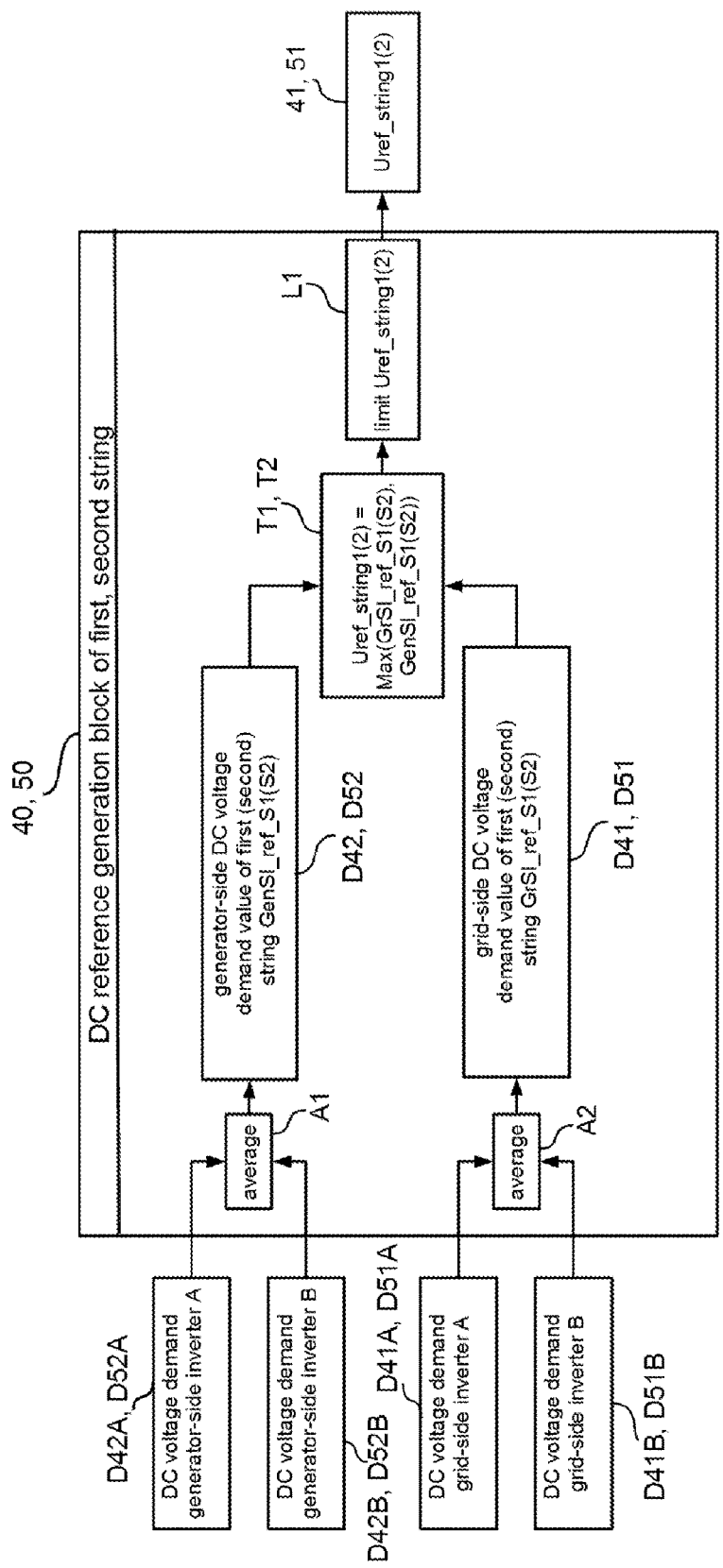
FIG. 7 is a block diagram that shows an exemplary method of determining a DC voltage reference of a converter string, as a part of the method illustrated by FIG. 6, in more detail.

A method of determining a reference DC-link voltage 30' for the dual string converter system 3' is described in conjunction with FIG. 6. DC voltage demand(s) of the grid-side inverter(s) of the first string D41 and DC voltage demand(s) of the generator-side inverter(s) of the first string D42 are received from the generator-side and grid-side inverters of the first string 15a, 15b by a DC voltage reference generation block of the first string 40. The DC voltage reference generation block, in this example, is part of the converter string controller of the first string 15 (either the grid-side or generator-side converter controller). In an activity T1, the highest DC voltage demand value out of the grid-side and generator-side DC voltage demand values of the first string D41, D42 is chosen as the DC voltage reference value of the first string 41 by this voltage reference generation block 40. The determination of the DC voltage demand values of the first string D41, D42 is further is illustrated in FIG. 7 and further described in conjunction with this figure.

In an analogous manner, in an activity T2, the highest DC voltage demand value out of the grid-side and generator-side DC voltage demand values of the second string D41, D42 is chosen as the DC voltage reference value of the second string 51. The determination of the grid-side and generator-side DC voltage reference values of the second string is also further described in conjunction with FIG. 7.

The DC voltage reference values of the first and second string 41, 42 are received by a system control unit, in this example represented by the master converter controller 15a, 15b, 16a, 16b (each of the generator-side or grid-side inverter controllers of the first or second string may function as the master converter controller). The reference DC-link voltage 30' is chosen as the maximum value out of the DC voltage references received from the first and second string 41, 51. This reference DC-link voltage 30' is transmitted to the DC voltage reference generation block 40 and the DC voltage reference generation block 50

Either the DC voltage reference generation block of the first string 40 or the DC voltage reference generation block of the second string 50 limit the reference DC-link voltage received if it should be out of bounds, hence outside of an admissible operation range of the inverters of one of the two strings. If both DC voltage reference generation block limit the reference DC-link voltage, as the DC-link reference voltage was out of bounds for inverters of the first string and for inverters of the second string, the highest lower limit or the lowest higher limit, depending on whether the reference DC-link voltage was to low or too high, is chosen as the new reference DC-link voltage 30'.

An exemplary determination of a DC voltage demand 41, 51 of the respective first or second string is shown in more detail in FIG. 7. Not all activities of this determination were shown in FIG. 6 for the sake of clarity.

The determination is exemplary described here for the first string. The determination of the DC voltage reference value of the second string is carried out in the same way and is therefore not further explained here. Reference sings in FIG. 7 are separated by commas ",". Reference signs on the left hand side of commas "," refer to elements and reference values of the first string and methods performed in the first string, while reference signs on the right hand side of commas "," refer to elements and reference values of the second string and methods performed in the second string. Reference signs without a comma refer to methods that are carried out analogously on both strings.

The DC voltage demand of a generator-side inverter A and the DC voltage demand of the a generator-side inverter B, corresponding to the rectifiers 4A, 4B of the converter system 3' are averaged in the activity A1 to obtain the generator-side DC voltage demand value of the first string D41. This method of determining the generator-side DC voltage demand value of a string can be, for example, applied to the parallel connected generator-side inverters 4A, 4B, or 4'A, 4'B of the respective first or second string 15, 16 schematically shown in FIG. 5.

Likewise, the DC voltage demand of a grid-side inverter A and the DC voltage demand of the a grid-side inverter B, corresponding to the grid-side inverters 5A, 5B of the converter system 3' are averaged in the activity A2 to obtain the DC voltage demand of the grid-side inverters of the first string. This method, can be applied, for example, to the parallel connected grid-side inverters 5A, 5B or 5'A, 5'B of the respective first or second string 15, 16 schematically shown in FIG. 5.

In the activity T1, mentioned above in conjunction with FIG. 6, the highest DC voltage demand is chosen out of the DC voltage demands D41, D51, of the generator-side and grid-side inverters of the first string.

This chosen highest DC voltage demand is limited in an activity L1 if it should be out of an admissible DC voltage range for one of the inverters. The limitation is to be understood as setting the DC voltage demand to the respective minimum or maximum admissible value if the chosen highest DC voltage demand was too low or too high or too low.

The limited highest DC voltage demand is then selected as the DC voltage reference value of the first string 41.

Figure 8:
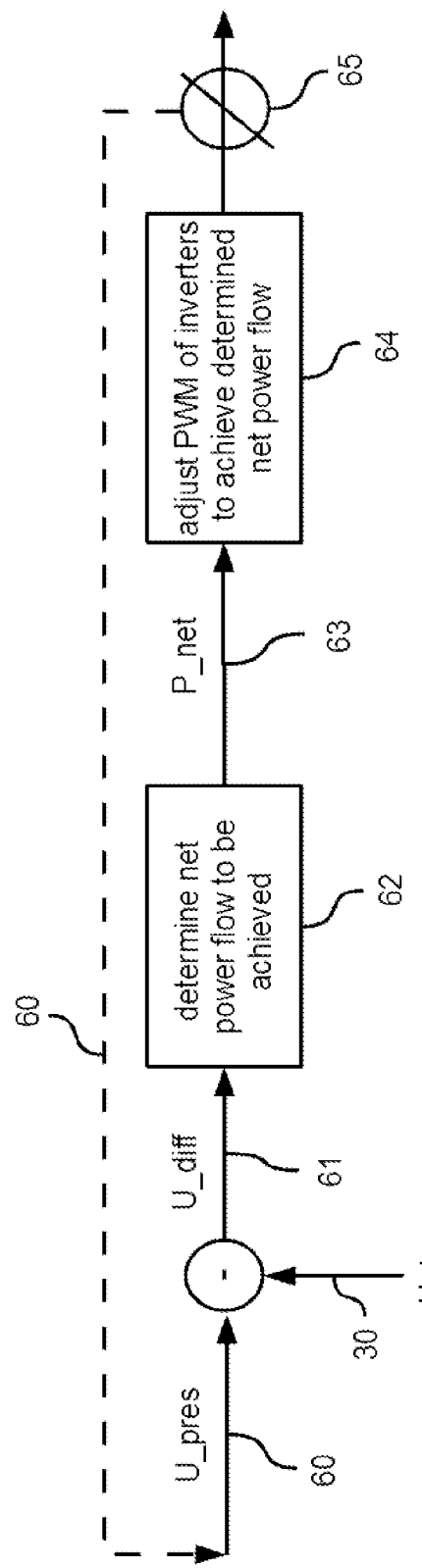
FIG. 8 is a block diagram that shows an exemplary method of operating a wind-turbine converter system, wherein the DC-link voltage is controlled to follow a reference DC-link voltage as determined as, for example, illustrated in FIG. 3, FIG. 6, and FIG. 7.

A block diagram of an exemplary method of operating a wind-turbine converter system is shown in FIG. 8. The DC-link voltage present in the wind-turbine converter system is controlled to follow a reference DC-link voltage as determined as described above.

A momentary DC voltage present in the DC link 60, is measured by a voltage sensor 65, is subtracted from a target voltage 30 that is identical to the reference DC link voltage determined as described in conjunction with the above described examples. The result of this subtraction is a positive or negative voltage difference 61, i.e. the deviation of the present DC-link voltage from the reference DC link voltage 30, depending on whether the present DC-link voltage is above or below the target voltage 30. Based on this voltage difference a net power flow 63 to be achieved is determined in activity 62. As described above, the net power flow is a difference between (active) power flowing into the DC-link at the generator-side inverter and (active) power flowing out of the DC-link at the grid-side inverter. A positive net-power flow increases the present DC-link voltage and a negative net power flow decreases the DC-link voltage. The determined net power flow 63 is established in the converter system by adjusting the pulse width modulation (PWM) of the generator-side and grid-side inverters in activity 64. After establishing the net power flow, the DC voltage momentarily present in the DC link 60 is again measured by voltage sensor 65, and again compared with the reference DC-link voltage, that might have changed in the meantime, to obtain another voltage difference 61. These activities are carried out continuously, so that the present DC-link voltage follows the target voltage 30.

Although certain products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

The invention claimed is:

1. A method of setting a reference voltage for a direct current (DC) link of a converter system of a wind turbine, wherein a plurality of generator-side inverters and a plurality of grid-side inverters of the converter system are electrically coupled by the DC link, the method comprising:

determining a generator-side DC voltage demand value based on first DC voltage demands received from the plurality of generator-side inverters;

determining a grid-side DC voltage demand value based on second DC voltage demands received from the plurality of grid-side inverters;

selecting a greater value of the generator-side DC voltage demand value and the grid-side DC voltage demand value; and determining the reference voltage for the DC link based on the greater value.

2. The method of claim 1, wherein determining the generator-side DC voltage demand value comprises averaging the first DC voltage demands, and wherein determining the grid-side DC voltage demand value comprises averaging the second DC voltage demands.

3. The method of claim 1, wherein the converter system comprises at least two converter strings, and wherein a generator-side DC voltage demand value of a first converter string is determined on the basis of at least one DC voltage demand of the generator-side inverters of the first converter string, a grid-side DC voltage demand value of the first converter string is determined on the basis of at least one DC voltage demand of the grid-side inverters of the first converter string, a DC voltage reference value of the first converter string is determined on the basis of the grid-side and generator-side DC voltage demand values of the first converter string, a generator-side DC voltage demand value of a second converter string is determined on the basis of at least one DC voltage demand of the generator-side inverters of the second converter string, a grid-side DC voltage demand value of the second converter string is determined on the basis of at least one DC voltage demand of the grid-side inverters of the second converter string, a DC voltage reference value of the second converter string is determined on the basis of the grid-side and generator-side DC voltage demand values of the second converter string, and wherein the reference voltage for the DC link is determined using the determined DC voltage reference values of the first and second converter string.

4. The method of claim 3, wherein determining the DC voltage reference value of the respective first and second converter string comprises selecting the highest DC voltage demand value out of the grid-side DC voltage demand value and the generator-side DC voltage demand value of the respective first and second converter string.

5. The method of claim 4, wherein determining the DC voltage reference value of a converter string comprises limiting the DC voltage reference value of the converter string in response to the DC voltage reference of the converter string value being above a given maximum DC voltage threshold or below a given minimum DC voltage threshold for the converter string.

6. The method of claim 3, wherein setting the reference DC-link voltage comprises selecting the highest DC voltage reference value out of the determined DC voltage reference values of the first and second reference converter string.

7. The method of claim 3, wherein the generator-side inverters of the first and second converter string are connected in series and the grid-side inverters of the first and second converter string are connected in series, wherein the series connection of the grid-side inverters of the first and second converter string and the series connection of the generator-side inverters of the first and second converter string each form a neutral connection point and these neutral-connection points are connected to each other by a center connection line, and wherein the series connection of generator-side inverters and the series connection of grid side inverters is coupled to each other via a positive DC level conductor and a negative DC level conductor.

8. The method of claim 7, wherein the reference DC voltage level of the first converter string is a reference DC voltage between the positive DC level conductor and the center connection line and wherein the reference DC voltage level of the second converter string is a reference voltage between the negative DC level conductor and the center connection line.

9. The method of claim 8, wherein the absolute of the voltage between the positive DC level conductor and the center connection line and the absolute of the voltage between the positive DC level conductor and the center connection line are equal under standard operation conditions of the wind turbine converter system.

10. The method of claim 9, wherein the reference DC-link voltage is the absolute of the voltage level between the positive or negative DC level conductor and the center connection line.

11. The method of claim 3, wherein the grid-side inverters of a converter string are electrically connected to each other in parallel and the generator-side inverters of a converter string are electrically connected to each other in parallel.

12. A method of operating a wind turbine converter system, the wind turbine converter system comprising at least one generator-side inverter, at least one grid-side inverter, and a direct current (DC) link coupling the at least one generator-side inverter and the at least one grid-side inverter, the method comprising:

determining a voltage of the DC link;

determining a reference voltage for the DC link, wherein determining the reference voltage comprises:

determining a generator-side DC voltage demand value based on at least one DC voltage demand received from the at least one generator-side inverter;

determining a grid-side DC voltage demand value based on at least one second DC voltage demand received from the at least one arid-side inverter; and selecting a greater value of the generator-side DC voltage demand value and the arid-side DC voltage demand value; and decreasing a deviation between the voltage and the reference voltage, wherein decreasing the deviation comprises:

determining a net power flow of the DC link, the net power flow being a difference between power flowing into the DC link at the at least one generator-side inverter and power flowing out of the DC link at the at least one grid-side inverter.

13. A converter system for a wind turbine, the converter system comprising:

a plurality of grid-side inverters;

a plurality of generator-side inverters;

a generator-side converter controller configured to determine a generator-side direct current (DC) voltage demand value based on first DC voltage demands received from the plurality of generator-side inverters; and a grid-side converter controller configured to determine a grid-side DC voltage demand value based on second DC voltage demands received from the plurality of grid-side inverters, wherein one of the grid-side converter controller and the generator-side converter controller is further configured to:

select a greater value of the generator-side DC voltage demand value and the grid-side DC voltage demand value: and determine a reference voltage for the DC link based on the greater value.

14. A wind turbine equipped with the converter system according to claim 13.

* * * * *